(12) United States Patent
Lundby

(10) Patent No.: US 7,095,710 B2
(45) Date of Patent: Aug. 22, 2006

(54) DECODING USING WALSH SPACE INFORMATION

(75) Inventor: Stein A. Lundby, Solana Beach, CA (US)

(73) Assignee: Qualcomm, San Diego, CA (US)

( * ) Notice: Subject to any disclaimer, the term of this patent is extended or adjusted under 35 U.S.C. 154(b) by 825 days.

(21) Appl. No.: 10/027,637

(22) Filed: Dec. 21, 2001

(65) Prior Publication Data

US 2003/0117941 A1 Jun. 26, 2003

(51) Int. Cl.
*H04J 11/00* (2006.01)
*H04B 7/216* (2006.01)

(52) U.S. Cl. ...................... 370/209; 370/477
(58) Field of Classification Search ................ 370/208, 370/209, 335, 342, 349, 477
See application file for complete search history.

(56) References Cited

U.S. PATENT DOCUMENTS

| 4,901,307 | A | | 2/1990 | Gilhousen et al. | |
|---|---|---|---|---|---|
| 5,103,459 | A | | 4/1992 | Gilhousen et al. | |
| 6,456,611 | B1 | * | 9/2002 | Hu et al. | 370/342 |
| 6,519,276 | B1 | * | 2/2003 | Kim et al. | 375/148 |
| 6,539,205 | B1 | * | 3/2003 | Wan et al. | 370/465 |
| 6,567,390 | B1 | * | 5/2003 | Banister et al. | 370/342 |
| 6,701,129 | B1 | * | 3/2004 | Hashem et al. | 455/67.11 |
| 6,731,618 | B1 | * | 5/2004 | Chung et al. | 370/328 |
| 6,785,298 | B1 | * | 8/2004 | Hwang | 370/479 |
| 2002/0105929 | A1 | * | 8/2002 | Chen et al. | 370/335 |
| 2002/0172168 | A1 | * | 11/2002 | Meier et al. | 370/335 |
| 2003/0039204 | A1 | * | 2/2003 | Tiedemann, Jr. | 370/209 |
| 2003/0103447 | A1 | * | 6/2003 | Thorson et al. | 370/209 |

* cited by examiner

*Primary Examiner*—Hassan Kizou
*Assistant Examiner*—Ahmed Elallam
(74) *Attorney, Agent, or Firm*—Philip R. Wadsworth; Thien T. Nguyen; S. Hossain Beladi

(57) ABSTRACT

Methods and apparatus to improve the speed and reliability of decoders are presented herein. Namely, a priori knowledge of Walsh space information is used to increase the speed at which messages are decoded. In systems where control messages contain transmission parameters of concurrently transmitted packet data, a faster demodulation and decoding of control messages allows a receiver to demodulate the packet data sooner, so that a shorter buffer is needed to store the received packet data. The receiver uses the Walsh space from the previous successfully decoded message to first decode the current message. If the decoding attempt is unsuccessful, the receiver then uses a neighboring Walsh space to decode the current message.

8 Claims, 4 Drawing Sheets

NOTE: TREE CAN HAVE VARYING DEPTHS FOR
VARIABLE LENGTH WALSH CODES

| WALSH CODES: | 1 | 2 | 3 | 4 | 5 | 6 | 7 | 8 |
|---|---|---|---|---|---|---|---|---|
| | 1 | 0 | 0 | 0 | 1 | 0 | 0 | 1 |

WALSH CODES: 1 2 3 4 5 6 7 8
| 1 | 1 | 0 | 0 | 1 | 0 | 0 | 1 |
FIG. 3C
WALSH CODES: 1 0 4 3 6 2 8 7
$WS_3 = 1, 0, 4$
$WS_4 = 1, 0, 4, 3$
$WS_5 = 1, 0, 4, 3, 6$
FIG. 4

DECODING USING WALSH SPACE INFORMATION

BACKGROUND

1. Field

The present invention relates generally to communications, and more specifically, to decoding signals received on wireless communication systems.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA, and the 3rd Generation Partnership Project 2 "3GPP2". Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communications systems that can be implemented. Within these various communications systems, multiple users must share limited system resources. In accordance with the actual system implementation, resources such as frequency bandwidth, time, transmission power, or spreading code assignments are typically shared by multiple users within the system. In a FDMA system, the system bandwidth is divided into many frequency channels and each frequency channel is allocated to a user. In a TDMA system, the system bandwidth is divided into many time slots and each time slot is allocated to a user. In a CDMA system, the system bandwidth is simultaneously shared among all users by using spreading codes, wherein each user is assigned a spreading code.

User demand drives the development of higher transmission data rate systems. In systems that can transmit data traffic in packetized formats, such as TDMA and CDMA systems, control information is transmitted containing essential information, such as the identity of the addressee, the modulation format, the coding format, the transmission timing, and the orthogonal codes used to cover the data. Receivers that cannot decode this control information correctly will fail to receive the packet data. Furthermore, receivers that cannot decode this information in a timely manner will have to store portions or all of the possible orthogonal codes with sufficient resolution in a memory element, whereupon the stored codes can be used to demodulate data information at a later time. Such an implementation would increase the complexity and cost of the receiver.

It is therefore desirable to provide means for the control information to be decoded with a high probability of success and in a timely manner. Possible methods of increasing the probability of correctly decoding the control information are to increase the transmission power at which the control information is transmitted or to increase the duration of the transmission. However, these methods are undesirable due to the increased consumption of system resources, which in turn, decreases the amount of available resources for the transmission of data. Methods to increase transmission data rates are useless without the ability to quickly and accurately decode received information. Hence, there is a current need for improving the speed and accuracy at which decoders operate.

SUMMARY

Methods and apparatus are presented herein to address the above stated needs. In one aspect, an apparatus is presented for decoding an over-the-air transmission, the apparatus comprising: a memory element; and a processing element configured to execute a set of instructions stored in the memory element, the set of instructions for: setting a current set of transmission parameters equal to a previous set of transmission parameters; decoding a received message using the current set of transmission parameters; if the current set of transmission parameters fails to decode the received message, then: altering the previous set of transmission parameters by an increment to derive a new set of transmission parameters; setting the current set of transmission parameters equal to the new set of transmission parameters; and decoding the received message using the current set of transmission parameters.

In another aspect, an apparatus is presented for decoding a control message that contains a set of transmission parameters associated with a data packet, the apparatus comprising: a memory element; and a processing element configured to execute a set of instructions stored in the memory element, the set of instructions for: receiving a new control message; attempting to decode the new control message using an old Walsh space that was used to decode a previous control message; and if the old Walsh space fails to decode the new control message, then attempting to decode the new control message using a new Walsh space, wherein the new Walsh space is generated by incrementing the old Walsh space.

In another aspect, a method is presented for decoding an over-the-air transmission, the method comprising: receiving a new over-the-air transmission; attempting to first decode the new over-the-air transmission using an old Walsh space that was used to decode a previous over-the-air transmission; and if the old Walsh space fails to decode the new over-the-air transmission, then attempting to decode the new over-the-air transmission using a new Walsh space, wherein the new Walsh space is generated by incrementing the old Walsh space.

In another aspect, a method is presented for decoding a transmission received over-the-air, the method comprising: setting a current set of transmission parameters equal to a previous set of transmission parameters; decoding a received transmission first using the current set of transmission parameters; if the current set of transmission parameters fails to decode the received transmission, then: altering the previous set of transmission parameters by an increment to derive a new set of transmission parameters; setting the current set of transmission parameters equal to the new set of transmission parameters; and decoding the received transmission using the current set of transmission parameters.

BRIEF DESCRIPTION OF THE DRAWINGS

FIG. 3C is a diagram of a bit representation of another Walsh code space.

FIG. 4 is a diagram of Walsh code spaces.

DETAILED DESCRIPTION

Figure 1:
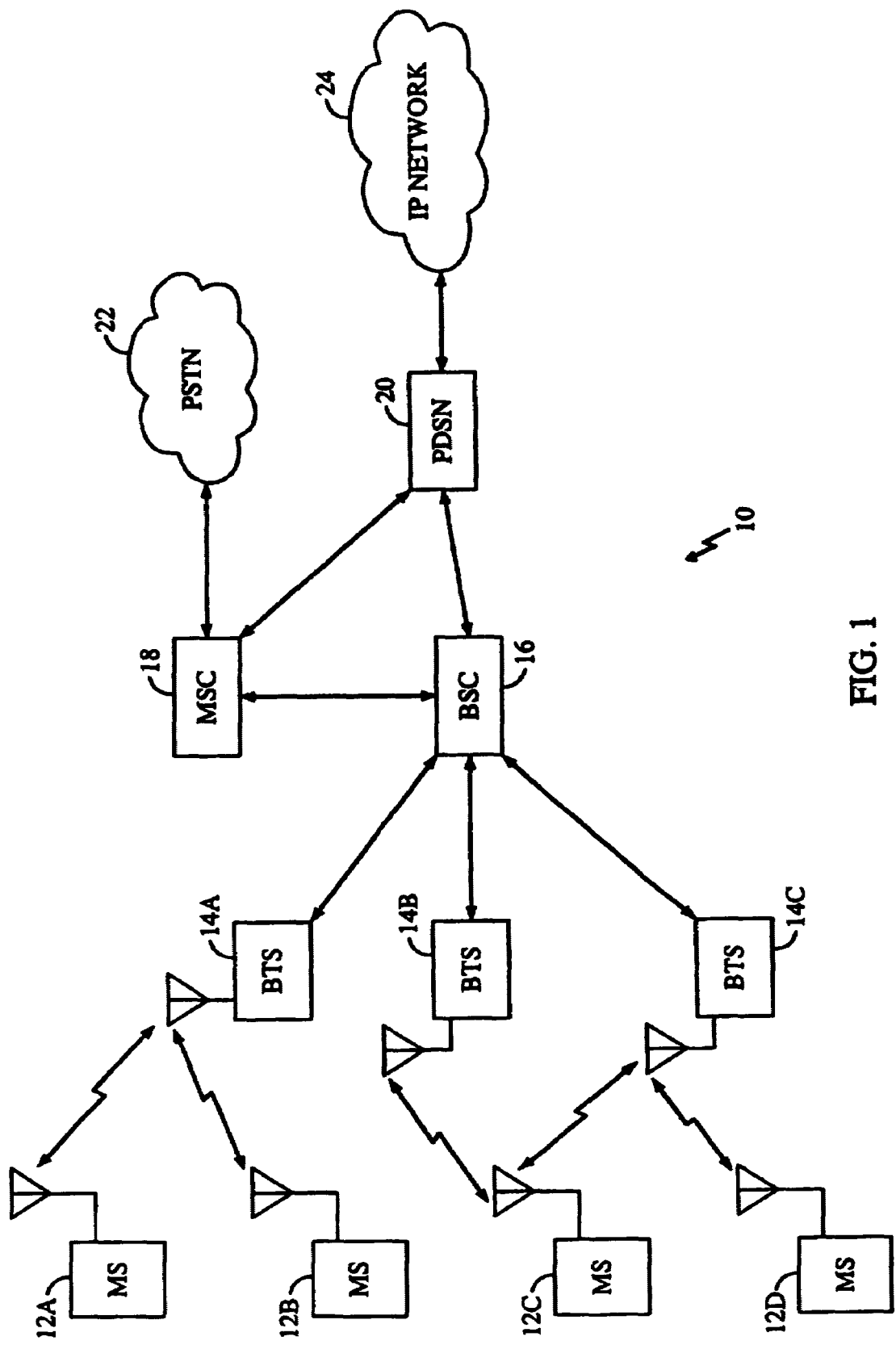
FIG. 1 is a diagram of a wireless communication network.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, the identity of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented using shift registers and exclusive-or operations, or turbo coding schemes, which comprise multiple convolutional encoding steps separated by interleaving steps.

Orthogonal and quasi-orthogonal spreading codes, such as the Walsh code sequences, are used to channelize the information sent to each remote station. In other words, spreading codes are used on the forward link to allow the system to overlay multiple users, each assigned a different orthogonal or quasi-orthogonal code, on the same frequency during the same time duration. For example, Walsh code sequences are generated by a Walsh function, which can be defined recursively as follows:

$$W(n) = \begin{vmatrix} W(n/2) & W(n/2) \\ W(n/2) & W'(n/2) \end{vmatrix},$$

where W' denotes the logical complement of W, and W(1)=0. Thus, $$W(2) = \begin{vmatrix} 0 & 0 \\ 0 & 1 \end{vmatrix}$$

and $$W(4) = \begin{vmatrix} 0 & 0 & 0 & 0 \\ 0 & 1 & 0 & 1 \\ 0 & 0 & 1 & 1 \\ 0 & 1 & 1 & 0 \end{vmatrix}.$$

W(8) is as follows:

$$W(8) = \begin{vmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{vmatrix}.$$

A Walsh sequence is one of the rows of a Walsh function matrix. A Walsh function of order n contains n sequences, each of length n bits. Data transmission is covered by one or several such spreading codes, thereby allowing CDMA separation between different transmissions occurring at the same time and on the same frequency. In this context, "code space" is a term that refers the set of spreading code sequences that is used to transmit the data.

In order to recover the original data bits of a data traffic channel, a decoder must be able to determine how many spreading codes are being used to cover the data, and which spreading codes are being used. Since a channel can use several possible spreading codes and a variety of optional coding and modulation formats, it is desirable for the decoder at a receiving end to be informed as to the actual transmission parameters used at the transmission end. The transmission parameters can be carried over one or several, separate control channels, which can be implemented to transmit occasionally or to transmit each time a data traffic transmission occurs. The receipt of the transmission parameters will allow the decoder to promptly begin decoding and demodulating the data traffic channel.

In certain systems, decoding the parameters rapidly is an important factor that allows a less costly receiver implementation. For example, in the standard known as cdma2000 1xEV-DV, which is currently under development under TIA and 3GPP2, reception of some transmission parameters begins concurrently with the reception of the data traffic, thereby requiring the receiver to sample and store the incoming signal at a rate and resolution that is sufficient to allow later recovery of the data traffic. This process is often referred to as "buffering" the incoming signal, and the memory element used to store this signal is large and consumes power, thereby increasing the cost of the remote station and increasing its power consumption. Use of this process means that a receiver must continuously buffer the incoming signal since the receiver has no prior knowledge of when data traffic will be intended for it. It is therefore desirable to allow faster decoding of the transmission parameters since the receiver could then demodulate the data traffic sooner, thereby allowing the design of a receiver with a shorter buffer and a smaller memory element.

The receipt of the transmission parameters on the control channel means that the decoder need not perform time-consuming and resource-consuming calculations for alternative transmission parameters on the data traffic channel. However, the decoder still needs to demodulate and decode the control message received on the control channel. The decoder operates by decoding the control message using one set of transmission parameters, checking the cyclic redundancy check CRC bits of the decoded control message, and repeating the process with the next set of transmission parameters if the CRC bits do not pass. The decoder is configured to perform this process for each set of transmission parameters until the CRC bits pass. As mentioned above, although the demodulation and decoding of the control channel in order to find the transmission parameters of the data traffic channel is more efficient than the demodulation and decoding of the data traffic channel alone, the delay incurred by the decoder operations for control channel demodulation and decoding causes a measurable increase in complexity and power consumption.

Successfully decoding the transmission parameters with high probability is also desirable. A receiver in a system that is designed to rely on explicit transmission parameter messages will not be able to decode the information on the data traffic channel if the transmission parameter messages are incorrectly decoded. A retransmission mechanism would then be necessary in order to convey the data to the receiver, thereby delaying the delivery of the data and wasting system resources. Varying delays due to retransmissions could cause, for example, video streaming applications to produce degradations observed by the end viewer. Not being able to determine the transmission parameters due to a decoding error will render the data traffic channel useless for its entire duration until a subsequent message with transmission parameters can be successfully decoded.

The embodiments described herein are directed to new methods and apparatus for improving the speed and reliability at which a receiving party can decode a control message. In particular, a decoder at the receiving end uses a priori information to perform a fast search of a probable set of Walsh code sequences, thereby reducing the decoding time and increasing the probability that the correct transmission parameter message is decoded.

Figure 2:
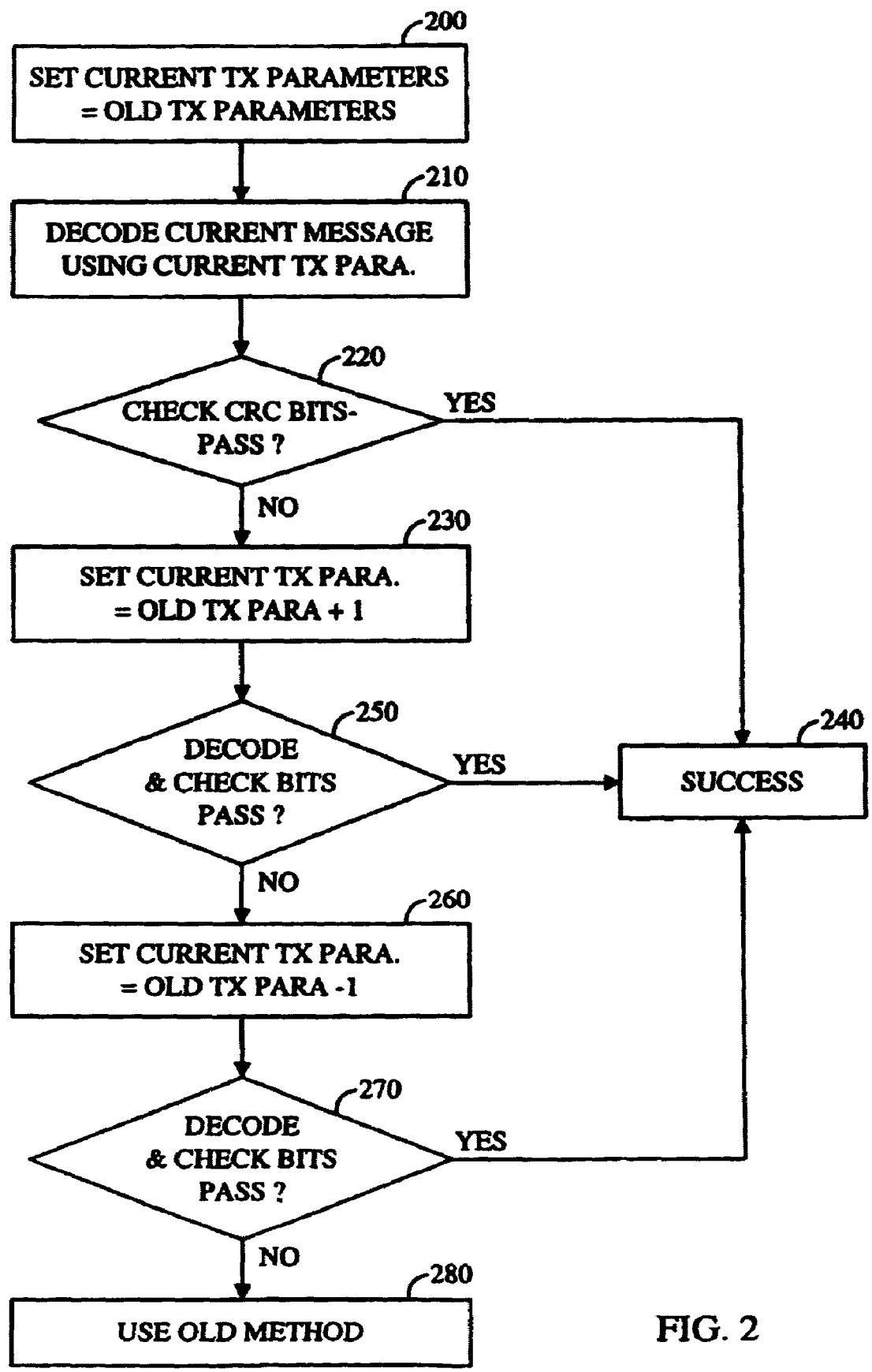
FIG. 2 is a flowchart of an embodiment for improving decoding speed.

FIG. 2 is a flowchart illustrating a first embodiment for the general method of improving the decoding of the control message. At step 200, the decoder is set to assume that the previous control message was successfully decoded. At step 210, the decoder uses the Walsh space information from the previous control message to decode the current control message. At step 220, the decoder examines the cyclic redundancy check (CRC) bits attached to the decoded control message. If the CRC bits do not pass, then the program flow proceeds to step 230. If the CRC bits pass, then the program flow proceeds to step 240, wherein the program flow ends as a success.

At step 230, if the CRC bits do not pass, the decoder attempts to decode the current control message again, but uses a new Walsh space that differs incrementally from the Walsh space of the previous control message. In one embodiment, the new Walsh space differs from the Walsh space of the previous control message by 1. At step 250, the decoder examines the CRC bits attached to the decoded message. If the CRC bits do not pass, then the program flow proceeds to step 260. If the CRC bits pass, then the program flow proceeds to step 240, wherein the program flow ends as a success.

At step 260, if the CRC bits do not pass, the decoder attempts to decode the current control message again, but uses another Walsh space that differs from the Walsh space of the previous control message by 1. At step 270, the decoder examines the CRC bits attached to the decoded message. If the CRC bits do not pass, then the program flow proceeds to step 280. If the CRC bits pass, then the program flow proceeds to step 240, wherein the program flow ends as a success.

Hence, in one embodiment, if the previous control message was decoded with Walsh code space $WS_i$, then the current control message is first decoded using Walsh code space $WS_{i+1}$, and then $WS_{i-1}$ if the attempt using $WS_{i+1}$ fails.

At step 280, if the CRC bits do not pass, then the decoder attempts to decode the current control message using the prior art method, where the decoder decodes the current control message using each possible Walsh space until the CRC bits pass.

Figures 3A, 3B:
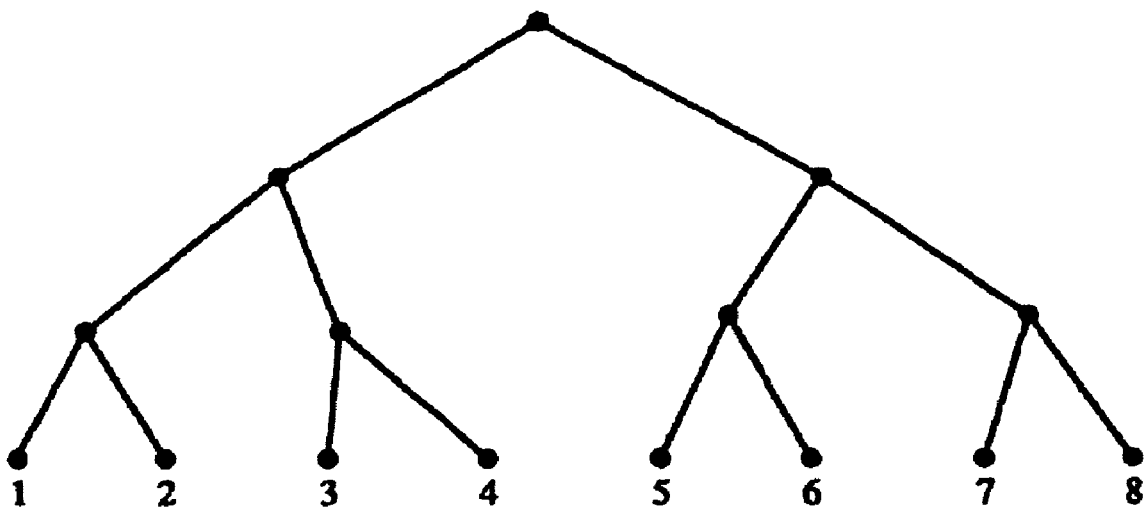
FIG. 3A is a diagram of a recursive tree structure for generating Walsh code sequences.
FIG. 3B is a diagram of a bit representation of a Walsh code space.

In one embodiment, the new Walsh code space can be determined by a change in one bit of the bit string that represents the previous Walsh code space. For example, if the Walsh code sequences are generated by a recursive tree structure as in FIG. 3A, the ends of the branches can be labeled consecutively. Both the transmission end and the receiving end are configured to read a bit space in a bit string as corresponding with a specific branch of the tree. FIG. 3B is an example of a bit string wherein only Walsh codes 1, 5, and 8 are used to cover the control message. In this embodiment, the decoder would be configured to change only bit of the bit string, and to then decode using the resulting Walsh code sequences. In the example of FIG. 3C, bit space 2 is changed from zero to one, so that the decoder would make an attempt to decode using Walsh code sequences 1, 2, 5, and 8.

In another embodiment, the new Walsh code space can be determined by proximity to a set of previously used Walsh code sequences. In a system that is configured to group Walsh code sequences into specific sets or spaces, such as the ones illustrated in FIG. 4, then the decoder can be configured to make a first attempt at decoding using an adjacent set. For example, if the previous control message was decoded using Walsh Space 4, which comprises the Walsh code sequences 1, 0, 4, 3, and this space fails to decode the current control message, then the decoder could attempt to decode using Walsh Space 5, which comprises the Walsh code sequences 1, 0, 4, 3, 6. If this attempt fails, then the decoder could attempt to decode using Walsh Space 3, which comprises the Walsh code sequences 1, 0, 4.

The present embodiments are directed towards improving the performance of the decoder. In particular, the embodiments are directed towards a simplified action of the decoder that will improve the speed at which decoding is performed and improve the reliability of the decoding process. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus for decoding an over-the-air transmission, comprising:
 a memory element; and
 a processing element configured to execute a set of instructions stored in the memory element, the set of instructions for:
  setting a current set of transmission parameters equal to a previous set of transmission parameters;
  decoding a received message first using the current set of transmission parameters;
  if the current set of transmission parameters fails to decode the received message, then:
   altering the previous set of transmission parameters by an increment to derive a new set of transmission parameters;
   setting the current set of transmission parameters equal to the new set of transmission parameters; and
   decoding the received message using the current set of transmission parameters, wherein the previous set of transmission parameters comprises a Walsh space.

2. The apparatus of claim 1, wherein altering the previous set of transmission parameters by an increment comprises adding a Walsh code sequence to the Walsh space.

3. The apparatus of claim 1, wherein altering the previous set of transmission parameters by an increment comprises subtracting a Walsh code sequence from the Walsh space.

4. The apparatus of claim 1, wherein altering the previous set of transmission parameters comprises replacing the Walsh space with a neighboring Walsh space.

5. A method for decoding a transmission received over-die-air, comprising:
 setting a current set of transmission parameters equal to a previous set of transmission parameters;
 decoding a received transmission first using the current set of transmission parameters;
 if the current set of transmission parameters fails to decode the received transmission. then:
  altering the previous set of transmission parameters by an increment to derive a new set of transmission parameters;
  setting the current set of transmission parameters equal to the new set of transmission parameters; and
  decoding the received transmission using the current set of transmission parameters; wherein the previous set of transmission parameters comprises a Walsh space.

6. The method of claim 5, wherein altering the previous set of transmission parameters by an increment comprises adding a Walsh code sequence to the Walsh space.

7. The method of claim 5, wherein altering the previous set of transmission parameters by an increment comprises subtracting a Walsh code sequence from the Walsh space.

8. The method of claim 5, wherein altering the previous set of transmission parameters comprises replacing the Walsh space with a neighboring Walsh space.

* * * * *